Feb. 26, 1929.  G. E. ABBOTT  1,703,083
MEASURING MACHINE
Filed June 29, 1927  3 Sheets-Sheet 1
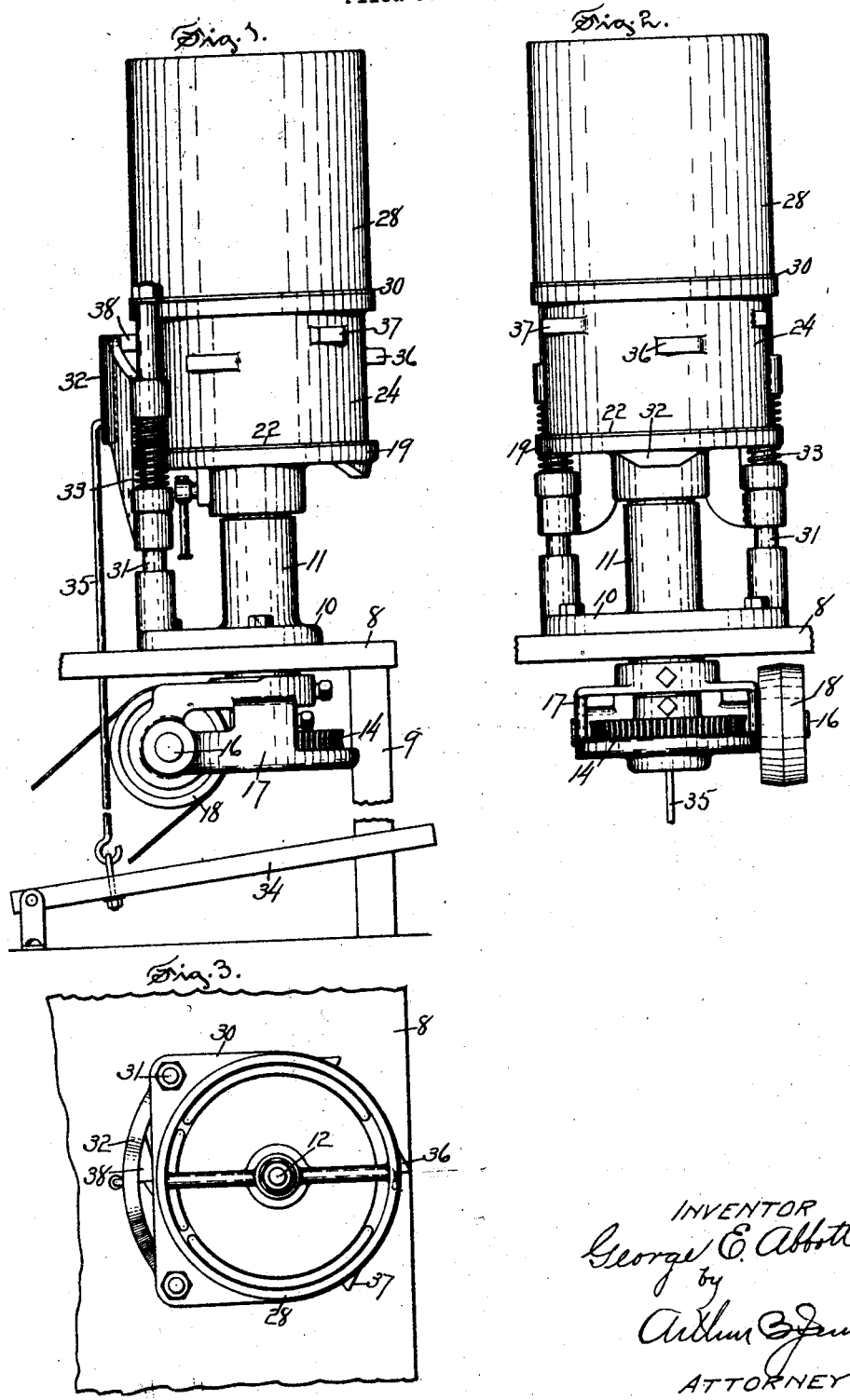
INVENTOR
George E. Abbott.
by
Arthur B. Jenkins,
ATTORNEY

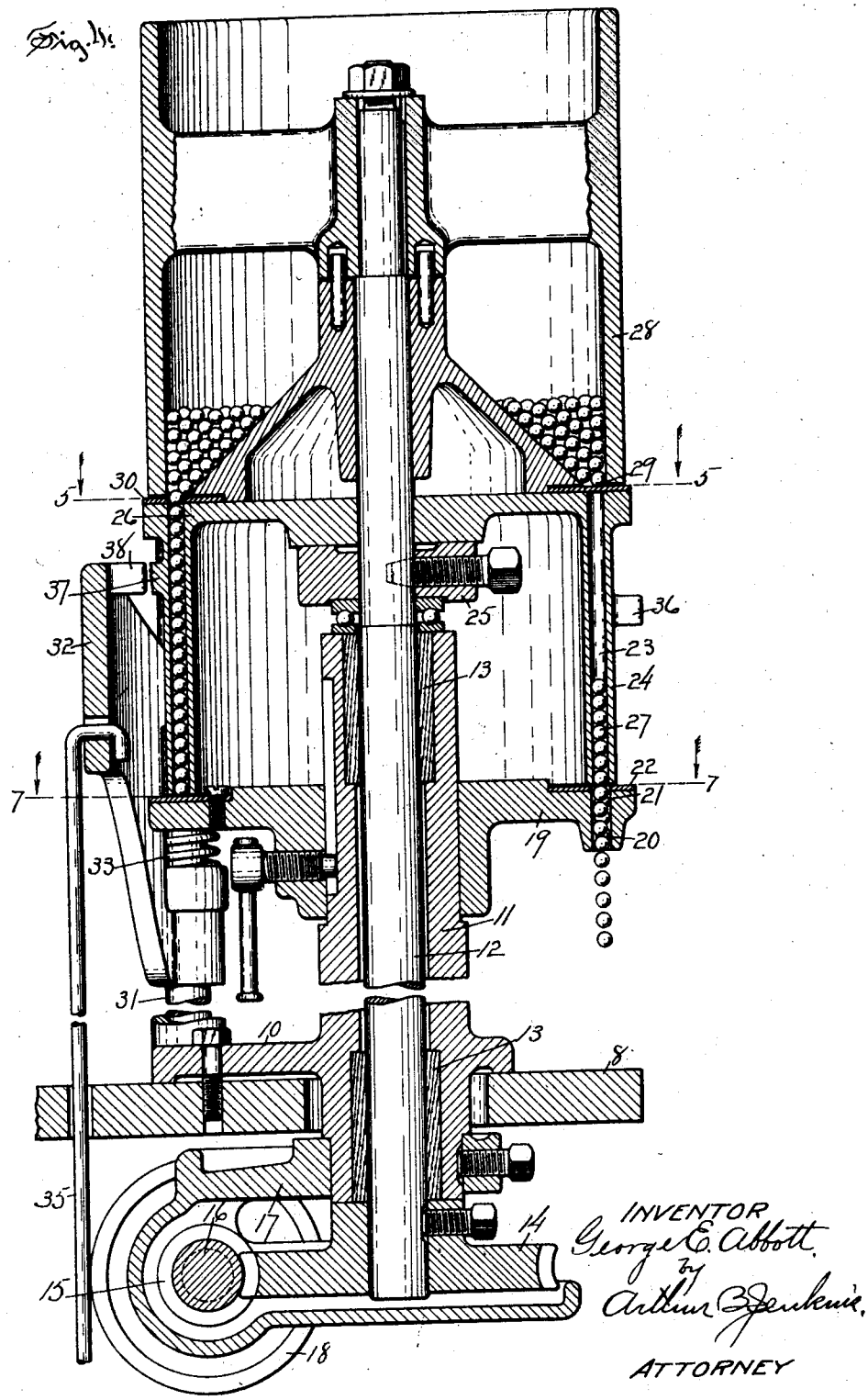

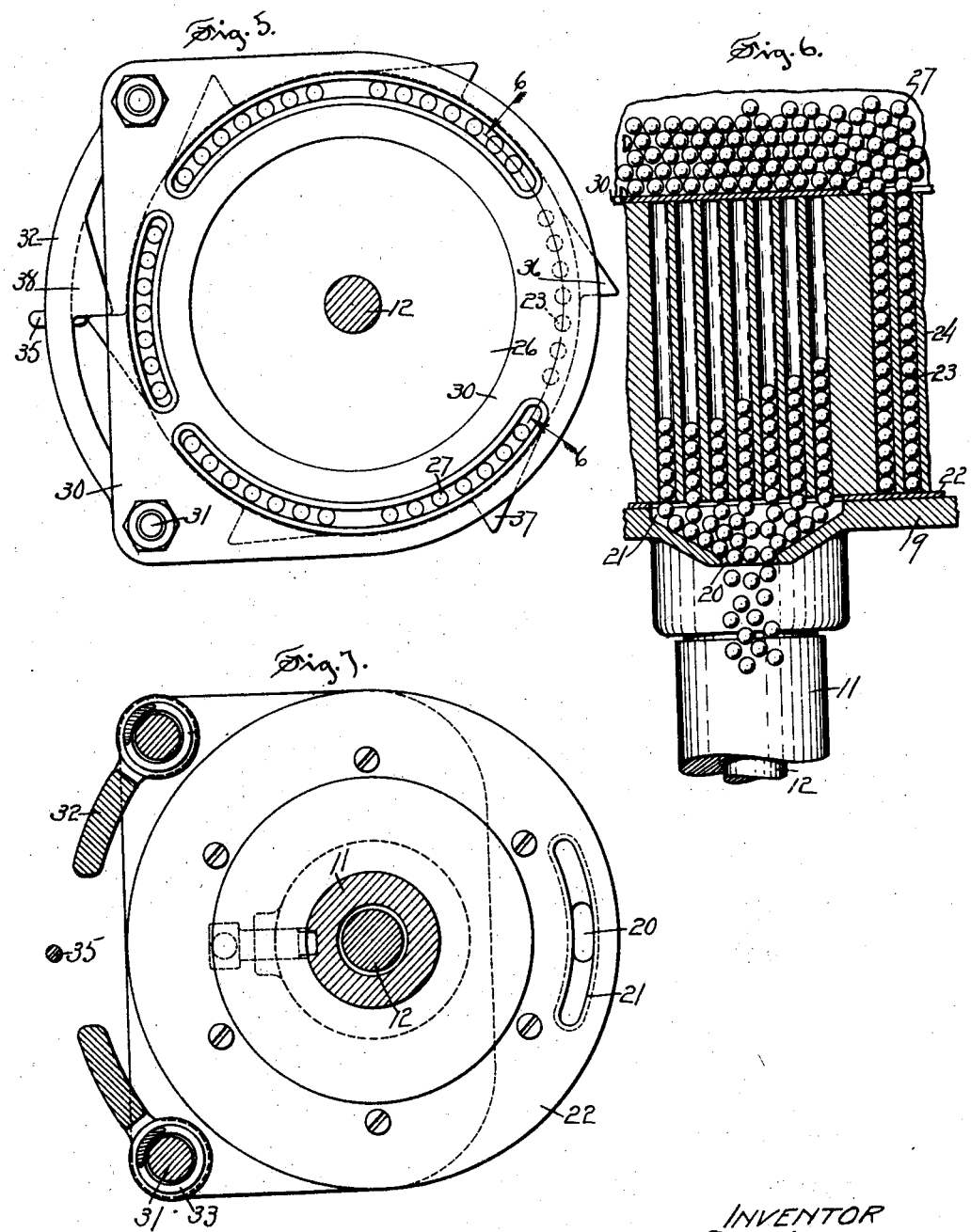

Patented Feb. 26, 1929.

1,703,083

UNITED STATES PATENT OFFICE.

GEORGE E. ABBOTT, OF WEST HARTFORD, CONNECTICUT.

MEASURING MACHINE.

Application filed June 29, 1927. Serial No. 202,452.

My invention relates to the class of machines employed for measuring material or objects for the purpose of segregating predetermined amounts or numbers of such material or objects for any desired purpose, and an object of my invention, among others, is the production of means for separating predetermined amounts of material or of objects and for delivering such separated amounts in a particularly rapid and efficient manner.

One form of measuring machine embodying my invention and in the construction and use of which the objects herein set out, as well as others, may be attained, is illustrated in the accompanying drawings, in which—

Figure 1 is a side view of my improved measuring machine.

Figure 2 is a view similar to Figure 1, but looking from a point at right angles to the point of view of Figure 1.

Figure 3 is a top view of the machine.

Figure 4 is a view, scale enlarged, in central vertical section through my improved machine.

Figure 5 is a view in cross section on a plane denoted by the dotted line 5—5 of Figure 4.

Figure 6 is a view in section on a plane denoted by the dotted line 6—6 of Figure 5.

Figure 7 is a view in section on a plane denoted by the dotted line 7—7 of Figure 4.

My improved measuring machine is not limited in its application to the measuring of any particular material as its uses may be greatly varied, either in the measuring of predetermined quantities of material or of objects, but as it is particularly adapted to measure special objects, such as balls made from metal and employed for various purposes, I have selected such objects for the purpose of illustration and description of my improved measuring machine forming the subject matter hereof.

In the accompanying drawings the numeral 8 denotes a table that may be supported as upon legs 9. A base plate 10 is secured to the table and has preferably an integral supporting sleeve 11 extending in opposite directions therefrom, one of the extensions projecting through an opening in the table 8. An actuating shaft 12 is supported in bearings 13 located at or near opposite ends of the sleeve and a worm gear 14 is secured to the lower end of the shaft and meshes with a driving worm 15 secured to a driving shaft 16 rotatably mounted in a housing 17 secured to the lower projecting end of the sleeve 11, and as shown in Figures 1 and 4, such shaft having any suitable means, as a pulley 18, for effecting its rotation.

A supporting plate 19 is mounted on the upper projecting part of the sleeve 11 and is vertically adjustable thereon, as shown in Figure 4. This plate has a discharge opening 20 that gradually lengthens out in the form of a slot 21 that is located in line with a slot in a delivery ring 22 secured to the plate 19. Said slots are located to register with wells 23 in a measuring drum 24 mounted on the actuating shaft 12. This drum is adapted to be connected for rotation with the shaft by means of a friction disc 25 secured to the shaft and upon which a head 26 of the drum rests.

The wells 23 are preferably formed in sets, each well being of a depth to take a certain quantity of material or number of objects, as balls 27, and in the arrangement herein shown each set of wells is arranged to contain a predetermined number of such elements, seven wells being shown as comprised in each set, and these wells are of a depth to contain eighteen balls of the size shown in Figure 6 and nineteen of the size shown in Figure 4. This, however, is immaterial. The slot 21 is substantially the length of each of the sets of wells, so that each of said sets of wells may be readily emptied of its contents that are discharged through the discharge opening 20.

A filling drum 28 is secured to rotate with the shaft just above the measuring drum 24, this filling drum preferably having a bottom sloping from the center toward the side walls, and as shown in Figure 4, and in which space the objects or material are placed. The narrow outlet 29 of the drum 28 is over a filling ring 30 resting upon the head 26 of the drum 24 and having slots to register with the sets of wells 23. This ring also is left unslotted at a point directly over the slot 21 in the delivery ring 22. The ring 30 is secured to the upper ends of posts 31 secured to and rising from the plate 10.

A controller 32 is mounted for sliding movement on the posts 31 and is held in its uppermost position by means of springs 33 mounted on the posts 31. The controller is moved to its lowermost position against the tension of the springs as by means of a treadle 34 connected with the controller as by a rod 35. Detents 36—37 project from the periphery of the drum 24 and a detent 38 projects from the controller 32 in position to register with the detents 36—37. These latter detents are arranged in staggered relation, and as shown in Figure 1 of the drawings, and each detent is appurtenant to one of the sets of wells 23.

In operation continuous rotation of the shaft 12 imparts continuous rotation to the drum 28 whereby the objects, as balls 27, are continuously fed into the line of movement of the sets of wells so that the latter are kept filled. This rotation of the shaft has a tendency to rotate the drum 24 through the frictional disc 25, but by reason of contact of the detent 38 with one of the detents 36 or 37 such rotation is prevented. However, assuming that the controller 32 is in its normal position pressure upon the treadle 34 will move the controller downwardly releasing the detent 38 from one of the detents 37 whereupon rotation of the drum 24 will ensue until the next detent 36 comes in contact with the detent 38 when rotation of the drum will cease. This part rotation will have been sufficient to have emptied one of the sets of wells of the balls contained therein, this operation being illustrated in Figure 6. Upon release of the treadle the detent 38 will be released from one of the detents 36 and moved by the spring 33 into the path of the detent 37 when the operation just described will be repeated.

The discharge opening 20 is conveniently located so that the balls or objects may be received in cartons or other receptacles in which they may be packed.

It will thus be seen that cartons or other receptacles may be rapidly filled at the discharge opening 20 at each alternate downward and upward movement of the treadle, said treadle being pressed down to fill one carton and then released whereby the spring will move it upwardly and permit rotation of the drum to fill the next carton.

It will be obvious that the controller may be placed in a neutral position whereby the drum 24 will be continuously operated and the arrangement of the grooves leading into the upper ends of the measuring wells, as well as the groove leading into the discharge opening 20 is particularly advantageous for operation in this manner, especially when objects, as balls, are being measured or counted, the grooves extending in the direction of movement of the measuring wells and also being coincident with such path. The tapering of the grooves causes the balls to travel in a direct path into the wells and into the discharge opening from said wells, thus avoiding any loss of time in the movement of the balls that travel substantially in a row following each other one by one into the wells and out from said wells.

Various drums 24 may be provided with wells adapted to contain different quantities of material or different numbers of articles of the same or different sizes, either by making the wells of different depths, or by various arrangements of the wells, or sets of wells, and the adjustability of the plate 19 lends itself readily to the substitution of one drum for another for this purpose.

As hereinbefore stated the invention readily lends itself to the measuring of material, either by segregating certain quantities of the material or by actually separating certain numbers of objects when such material is thus composed and as especially illustrated in connection with this application.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A measuring machine including a hollow movably mounted measuring member having measuring wells therein arranged in rows extending peripherally around said member, a discharge member to cover the outlet ends of said wells but having a discharge opening located in the path of movement of said wells to effect the discharge of the contents thereof as they pass over said opening, and means for moving said measuring member.

2. A measuring machine including a hollow rotatably mounted measuring member having measuring wells therein arranged in rows extending peripherally around said member, a discharge member to cover the outlet ends of said wells but having a discharge opening located in the path of movement of said wells to effect the discharge of the contents thereof as they pass over said opening, and means for moving said measuring member.

3. A measuring machine including a hollow movably mounted measuring member having measuring wells therein arranged in rows extending peripherally around said member, a discharge member to cover the outlet ends of said wells but having a discharge opening elongated in the direction of travel of said wells to effect the discharge of the contents thereof as they pass over said opening, and means for moving said measuring member.

4. A measuring machine including a hollow movably mounted measuring member having measuring wells therein arranged in rows extending peripherally around said member, a discharge member to cover the outlet ends of said wells but having a discharge opening located in the path of movement of said wells to effect the discharge of the contents thereof as they pass over said opening, means for moving said measuring member, and a filling member having an outlet opening located in the path of movement of said wells.

5. A measuring machine including a hollow movably mounted measuring member having measuring wells therein arranged in rows extending peripherally around said member, means for removably mounting said member to permit use of different members having wells of different depths, a discharge member to cover the outlet ends of said wells but having a discharge opening located in the path of movement of said wells to effect the discharge of the contents thereof as they pass over said opening, means for adjusting the position of the discharge member to accommodate measuring members having wells of different depths, and means for moving said measuring member.

6. A measuring machine including a movably mounted measuring member having measuring wells therein, a discharge member to cover the outlet ends of said wells but having a discharge opening located in the path of movement of said wells, means for moving said measuring member, and a controller to stop movement of said measuring member at predetermined places to permit discharge of the contents of said wells.

7. A measuring machine including a movably mounted measuring member having measuring wells therein, a discharge member having means to permit discharge of the contents of said wells when the measuring member is moved to a predetermined position, means for moving said measuring member, and a reciprocating controller with means to stop movement of said measuring member in said different predetermined positions by movement of the controller in opposite directions.

8. A measuring machine including a movably mounted measuring member having measuring wells therein, a discharge member having means to permit discharge of the contents of said wells, means for moving said measuring member, detents on said measuring member each to operate in connection with certain wells, and a controller having means to engage said detents to permit discharge of the contents of said wells.

9. A measuring machine including a movably mounted measuring member having measuring wells therein, a discharge member having means to permit discharge of the contents of said wells, means for moving said measuring member, detents on said measuring member each to operate in connection with certain wells, a controller having movement in opposite directions, and means on said controller to engage one of said detents in each movement of the controller in one or the other of said opposite directions.

10. A measuring machine including a movably mounted measuring member having measuring wells therein, a discharge member having means to permit discharge of the contents of said wells, means for moving said measuring member, detents arranged in sets on said measuring member, each detent being associated with certain wells, a controller having movement in opposite directions, and a detent on said controller arranged to engage a detent of one of said sets in each movement of the controller in one or the other direction.

11. A measuring machine including a movably mounted measuring member having measuring wells therein, a discharge element, means for continuously exerting frictional force to move said member, a controller, means on said controller to hold said measuring member against movement, means for actuating said controller to release said measuring member, said discharge member having means to permit discharge of the contents of said wells as the measuring member is moved to certain positions.

12. A measuring machine including a movably mounted measuring member having measuring wells therein, a stationary discharge member to cover the outlet ends of said wells and having a discharge opening located in the path of movement of said wells, means for moving said measuring member, means for controlling movement of said measuring member to permit discharge of the contents of said wells, and a filling drum located in a stationary position over said measuring member and having outlet openings to deliver articles to said wells and a blank space overlying said discharge opening in said discharge member.

13. A measuring machine including a base, a shaft projecting upwardly through said base, means for rotating the shaft, a stationary discharge member through which said shaft extends, a measuring member operatively connected with said shaft and having wells to register with a discharge opening in said measuring member, a filling drum overlying said measuring member and having means for supplying said wells, a post rising from said base, and a controller slidably mounted on said post to regulate movement of said measuring member.

14. A measuring machine including a base, a sleeve projecting upwardly from said base, a discharge member adjustably attached to said sleeve, a driving shaft extending upwardly through said base and sleeve, a measuring member frictionally connected with said shaft and having measuring wells to register with a discharge outlet in said discharge member, a controller for controlling operation of said measuring member, and a filling member overlying said measuring member and having means to supply said wells.

15. A measuring device including a measuring member having a measuring well therein of substantially the size of articles to be measured, a filling member for said articles, a passage leading into said well and formed to effect movement of said articles in line in succession one by one into said well, and means for causing relative movement between said measuring and said filling member.

16. A measuring device including a measuring member having a measuring well therein of a size having special reference to articles to be measured, means for supplying articles to said measuring member, a discharge member having an outlet, a passage constituting a groove leading to said outlet and of a width to effect movement of said articles in line into said outlet from said well, and means for causing relative movement between said measuring member and said discharge member.

17. A measuring device including a measuring member having a measuring well therein, a cooperating member having an opening communicating with said well and including a groove circularly arranged to register with the path of relative movement between said well and said opening, whereby articles are moved in line one by one following each other, and means for causing relative movement between said measuring and cooperating members.

18. A measuring device including a measuring member having a series of wells arranged in line, a filling member having a chamber with a bottom formed as a groove of a width substantially that of the width of said wells, said groove being coincident with the line of said wells, a passage opening between said groove and said wells, and means for effecting relative movement between said filling member and said measuring member.

GEORGE E. ABBOTT.